Figure 1:
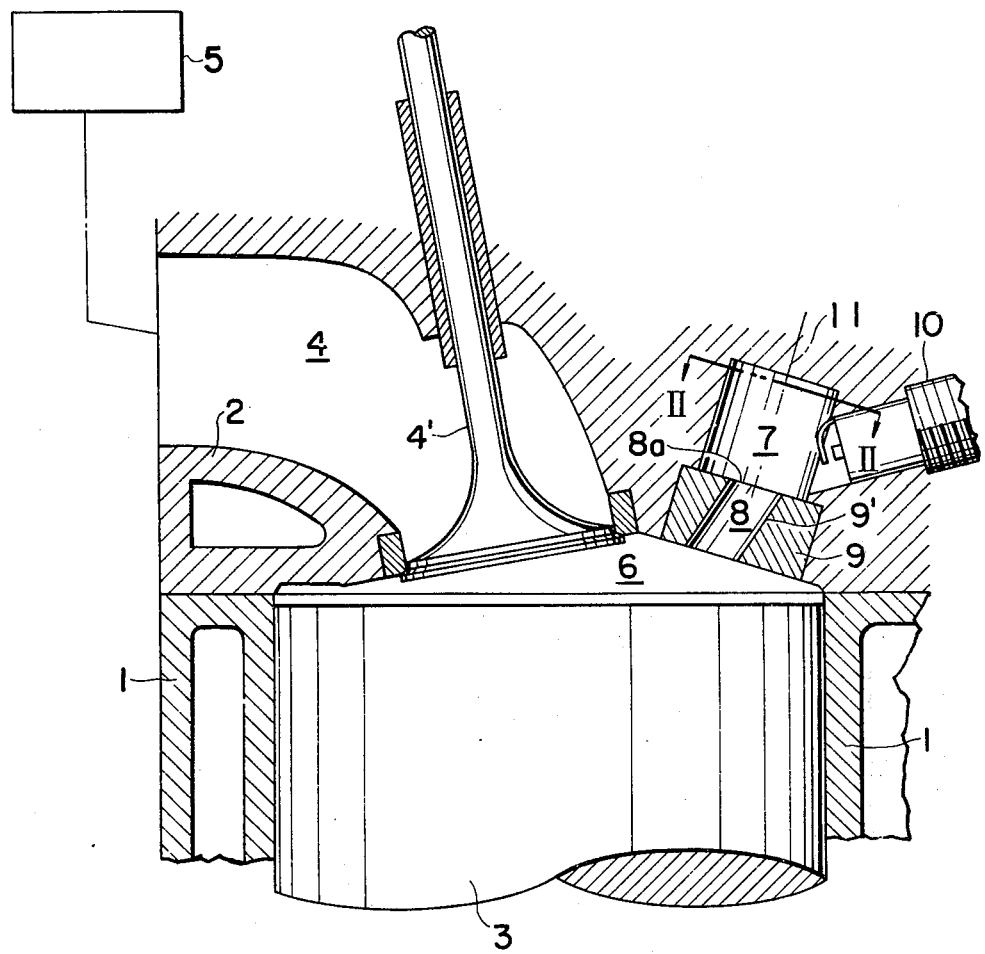

United States Patent [19]

Kunii

[11] 3,999,530
[45] Dec. 28, 1976

[54] INTERNAL COMBUSTION SPARK IGNITION ENGINE

[75] Inventor: Kazuya Kunii, Yokohama, Japan

[73] Assignee: Nissan Motor Co., Ltd., Yokohama, Japan

[22] Filed: Apr. 3, 1975

[21] Appl. No.: 564,693

[30] Foreign Application Priority Data

Apr. 19, 1974 Japan .............................. 49-44779

[52] U.S. Cl. ...................... 123/191 S; 123/DIG. 4
[51] Int. Cl.² ........................................ F02B 19/10
[58] Field of Search ...... 123/191 S, 191 SP, 32 ST, 123/75 B, 32 SP, 30 C, 30 D, 32 K

[56] References Cited

UNITED STATES PATENTS

| | | | |
|---|---|---|---|
| 2,043,080 | 6/1936 | Vincent | 123/30 C |
| 2,118,058 | 5/1938 | Riley | 123/191 SP |
| 3,192,912 | 7/1965 | Stümpfig | 123/191 S |
| 3,776,212 | 12/1973 | Karlowitz | 123/191 SP |
| 3,924,584 | 12/1975 | Decker | 123/30 C X |

*Primary Examiner*—Charles J. Myhre
*Assistant Examiner*—William C. Anderson

[57] ABSTRACT

The disclosure concerns an internal combustion spark ignition engine including a cylinder; a reciprocating piston in said cylinder and defining a combustion chamber therewith; dividing means for dividing the combustion chamber into a main and an auxiliary section, said auxiliary section being in communication with only the main section, an orifice in said dividing means for connecting the said sections, the volumes of the main and auxiliary sections and the size of the orifice being selected to be such that, during a compression cycle, part of the combustible mixture of air and fuel enters into the auxiliary section in such a manner as to cause great turbulence therein, and a spark plug provided in the auxiliary section for causing ignition.

3 Claims, 2 Drawing Figures

INTERNAL COMBUSTION SPARK IGNITION ENGINE

The present invention relates to an internal combustion spark ignition engine, and more particularly to an engine which includes a cylinder, a reciprocating piston in the cylinder and defining a combustion chamber therewith and in which the main section of the combustion chamber is connected with an auxiliary section through an orifice.

In certain of the conventional internal combustion spark ignition engines of the above character it has been a common practice to connect an auxiliary intake channel, in addition to a main intake channel connected with the main section of the combustion chamber, with an auxiliary section to draw in a relatively rich mixture through the auxiliary intake channel during an intake stroke. Thus this conventional engine is complicated in construction and has a cost disadvantage, as compared to the ordinary automotive internal combustion engines without an auxiliary section and an orifice.

It is a main object of the present invention to provide an internal combustion spark ignition engine of the above character in which an auxiliary intake channel is obviated.

In accordance with the present invention, there is provided an internal combustion spark ignition engine including a cylinder, a reciprocating piston in said cylinder and defining a combustion chamber therewith; dividing means for dividing the combustion chamber into a main and an auxiliary section, said auxiliary section being in communication with only the main section, an orifice in said dividing means for connecting the said sections, the volumes of the main and auxiliary sections and the size of the orifice being selected to be such that, during a compression cycle, part of the combustible mixture of air and fuel enters into the auxiliary section in such a manner as to cause great turbulence therein, and a spark plug provided in the auxiliary section for causing ignition.

Figure 2:
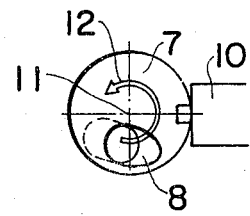

The invention will be described, merely by way of example, with reference to the accompanying drawings, in which:

FIG. 1 is a schematic sectional view of an internal combustion spark ignition cylinder and piston; and FIG. 2 is a schematic sectional view taken through II—II of FIG. 1.

Referring now to the drawings and particularly to FIG. 1, the combustion chamber shown is defined by cylinder walls 1, cylinder head 2 and the crown of a piston 3. The sectional view in FIG. 1 is such that intake channel 4 and its associated intake valve 4' are shown. An exhaust channel and its associated exhaust valve are not shown. Conventional carburetor 5 communicates with the intake channel 4 in a conventional manner. Main section 6 of the combustion chamber is connected with an auxiliary section or combustion pod 7 by an orifice 8 which is formed though a dividing member 9 of an adiabatic material. Spark plug 10 is positioned within the combustion pod 7. As will be understood from FIGS. 1 and 2, the combustion pod 7 assumes the form of a cylindrical cavity having a cylinder axis 11, and walls 9' of the orifice 8 is inclined with respect to the cylinder axis 11 of the combustion pod 7 and a port 8a at which the orifice 8 opens to the combustion pod 7 is disposed offset from the cylinder axis 11 (see FIG. 2) such that, during a compression cycle, part of a combustible air-fuel mixture enters into the combustion pod 7 in such a manner as to cause great turbulence therein (the turbulence direction of the stream of combustible mixture in the combustion pod 7 being shown by an arrow 12).

During the compression stroke fresh combustible mixture is pushed into the combustion pod 7 through the orifice 8. The kinetic energy of the stream entering the pod 7 is rapidly converted into turbulence, so that at the time of ignition by the spark of the spark plug 10, the mixture in the combustion pod 7 is in highly turbulent motion. This highly turbulent motion of mixture facilitates the mixing of fuel with air and it sweeps exhaust gas around the electrode of the spark plug 10 with fresh mixture, thereby ensuring stable ignition in the pod 7. Shortly after ignition the pressure in the pod 7 exceeds the pressure in the cylinder and a high velocity burning jet, often referred to as a "torch", is injected into the main section 6 through the orifice 8. This jet spreads the flame out over the volume of the combustion chamber and generates the turbulence necessary for rapid completion of combustion. During the fast pressure rise in the combustion chamber the pressure differential across the passage is again reversed, and the pod 7 acts as a damper against pressure fluctuations. During the expansion stroke and at the time of opening of the exhaust valve, the pressure in the pod is higher than in the cylinder and again a jet issues from the orifice 8. This entrains and mixes the contents of the cylinder and facilitates thereby the burning of the quenched fraction of the mixtures.

A series of tests, conducted by inventor, with the engine described in the preceding description indicated that if volume ($cm^3$) of the pod 7 is about 10% of the combustion chamber volume ($cm^3$) at top dead center, and ratio (A/V) of area ($cm^2$) of the orifice 8 (A) to volume ($cm^3$) of the pod 7(V) is about 0.15, then stable ignition of the mixture in the pod 7 and passing of the jet flame through the orifice 8 without quench result. It was also confirmed that sufficient power and performance for a propellant as an automobile were yielded by operating the engine with a lean mixture having an air-to-fuel ratio (A/F) between 17 and 20.

It will now be appreciated as one of advantages that the engine of the present invention does not require the provision of an auxiliary intake passageway and its associated valve.

It will also be appreciated that the use of very lean mixture and strong turbulent mixing result in very low emission of NOx, CO and unburned hydrocarbons (HC) in the engine exhaust.

The operating test of the engine of the present invention with exhaust gas recirculation (EGR) system was also made, and it was confirmed that operating the engine with a mixture having an air-to-fuel ratio (A/F) between 13 and 17 results in stable ignition in the auxiliary section 7 and reduction of NOx, CO and HC.

What is claimed is:

1. An internal combustion engine comprising:
   a cylinder;
   a reciprocating piston in said cylinder and defining a combustion chamber therewith;
   means for dividing the combustion chamber into a main section and an auxiliary section, said auxiliary section being in communication with only said main section;
   said dividing means defining an orifice connecting said main and auxiliary sections;

means for introducing a lean combustible mixture only to the main section of the combustion chamber;

said auxiliary section taking the form of a cylindrical cavity having a cylinder axis;

the orifice being inclined with respect to the cylinder axis and having a port opening to the auxiliary section, the port of the orifice being disposed offset from the cylinder axis;

the volumes of the main and auxiliary sections and the size of the orifice being selected such that during the compression cycle part of the combustible mixture rushes into the auxiliary section causing great turbulence therein; and a spark plug having an electrode and with said electrode disposed within a radially outer area of the cylindrical cavity.

2. An internal combustion engine as claimed in claim 1, which a ratio of orifice area ($cm^2$) to volume ($cm^3$) of the auxiliary section is about 0.15.

3. An internal combustion engine as claimed in claim 1, in which volume of the auxiliary section is about 10 per cent of the combustion chamber volume at top dead center.

* * * * *